United States Patent
Imatake et al.

[11] Patent Number: 6,026,781
[45] Date of Patent: Feb. 22, 2000

[54] FUEL INJECTION CONTROL DEVICE OF CYLINDER DIRECT INJECTION ENGINE

[75] Inventors: Nobuo Imatake; Shingo Morishima; Kimitaka Saito; Tokio Kohama, all of Nishio; Tatsuo Kobayashi, Susono, all of Japan

[73] Assignees: Nippon Soken, Inc., Nishio; Toyoda Jidosha Kabushika Kaisha, Toyota, both of Japan

[21] Appl. No.: 09/166,588

[22] Filed: Oct. 6, 1998

[30] Foreign Application Priority Data

Dec. 25, 1997 [JP] Japan ................................ 9-357411

[51] Int. Cl.⁷ ............................. F02D 41/40; F02B 17/00
[52] U.S. Cl. ....................... 123/299; 123/295; 123/478; 123/480
[58] Field of Search ................................... 123/299, 295, 123/305, 300, 492, 493, 478, 480, 486

[56] References Cited

U.S. PATENT DOCUMENTS

| | | | |
|---|---|---|---|
| 4,955,339 | 9/1990 | Sasaki et al. | 123/295 |
| 5,170,759 | 12/1992 | Ito | 123/276 |
| 5,239,966 | 8/1993 | Yamagata et al. | 123/493 |
| 5,241,939 | 9/1993 | Nonaka | 123/492 |
| 5,271,362 | 12/1993 | Kobayashi et al. | 123/299 |
| 5,638,790 | 6/1997 | Minowa et al. | 123/436 |
| 5,782,221 | 7/1998 | Woldt et al. | 123/436 |
| 5,947,087 | 9/1999 | Minowa et al. | 123/399 |

FOREIGN PATENT DOCUMENTS

| | | |
|---|---|---|
| 61-250361 | 11/1986 | Japan . |
| 61-250364 | 11/1986 | Japan . |
| 2-169834 | 6/1990 | Japan . |

*Primary Examiner*—Willis R. Wolfe
*Assistant Examiner*—Hieu T. Vo
*Attorney, Agent, or Firm*—Pillsbury Madison & Sutro LLP

[57] ABSTRACT

A fuel injection control device in a cylinder direct injection engine which switches between premixed combustion by intake stroke injection and stratified combustion by compression stroke injection in accordance with a change of an engine speed or a required load, where an unpleasant torque shock occurring when the injection mode is changed and the combustion state is changed despite the vehicle operating in the driving pattern such as driving on an upward slope or downward slope is prevented by maintaining the same injection mode while the vehicle continues to operate in the same driving state and where stratified combustion by the compression stroke injection is carried out when the vehicle is in driving on a downward slope, but is augmented by intake stroke injection when the vehicle sharply accelerates and the torque becomes insufficient.

6 Claims, 6 Drawing Sheets

FUEL INJECTION CONTROL DEVICE OF CYLINDER DIRECT INJECTION ENGINE

BACKGROUND OF THE INVENTION

1. Field of the Invention

The present invention relates to an engine in which fuel is directly injected into a combustion chamber, that is, a "cylinder direct injection engine".

2. Description of the Related Art

A direct injection engine in which fuel is directly injected into the combustion chamber injects the fuel in a compression stroke under operating conditions of a low required load so as to enable stratified combustion forming an air/fuel mixture only at the periphery of a spark plug. In this case, a throttle valve is not throttled, therefore a pumping loss can be reduced and it becomes possible to improve a fuel consumption.

Further, under operating conditions of a high required load, by injecting the fuel in a intake stroke to lower the temperature of the intake gas in the combustion chamber, the charging efficiency can be improved. Further, the output can be improved by suppressing knocking.

Accordingly, in the art disclosed in for example Japanese Unexamined Patent Publication (Kokai) No. 61-250361 and Japanese Unexamined Patent Publication (Kokai) No. 61-250364, it is possible to simultaneously achieve both a low fuel consumption and a high output by switching the injection timing of the fuel between the compression stroke and the intake stroke in accordance with the required load conditions (degree of depression of accelerator pedal, engine speed, etc.)

When driving over a level road, the driver changes the degree of depression of the accelerator pedal (load) by only one driving pattern among three patterns, that is, to increase the speed of the vehicle from the current speed, to maintain the speed of the vehicle, and to lower the speed of the vehicle, therefore the accelerator pedal is not operated that frequently. Further, when the vehicle speed conspicuously changes, the combustion mode is simultaneously switched by the switching of the injection timing. Accordingly, the driver and passengers do not feel the slight switching shock such as the change of the vehicle speed occurring when the injection timing of the fuel and the combustion mode are switched as being uncomfortable.

However, when the inclination of the road changes during driving, that is, when the road goes up, levels off, or goes down, the driver has to operate the accelerator pedal frequently even when merely desiring to maintain the current vehicle speed. If the injection timing of the fuel and the combustion mode are switched at every operation of the accelerator pedal, many small changes in speed will occur even when driving at a constant speed. This shock is transferred to the human body each time resulting in an uncomfortable feeling in the driver and passengers.

SUMMARY OF THE INVENTION

In consideration with the problems of the related art as described above, an object of the present invention is to reduce the frequency of the switching of the combustion mode by just control of the fuel injection while preventing the engine structure from being any more complex and thereby to stabilize the operating state of the automobile or other vehicle mounting that engine.

To attain the above object, the present invention uses the technical means disclosed in the claims.

In a fuel injection control device disclosed in claim 1, when the vehicle (automobile) is driving on an upward slope or a downward slope, the same injection mode is maintained without changing the injection mode of the fuel injector and accordingly without changing the combustion state (stratified combustion and premixed combustion) even if for example the degree of depression of the accelerator pedal, used as an indicator of a magnitude of the load (output) required for the engine, changes.

Due to this, a shock due to a torque fluctuation at the time of switching of the combustion state (torque shock) is eliminated and, at the same time, the accelerator pedal response is improved, whereby the driving stability can be increased.

Further, by changing the injection mode together with control of an automatic transmission or control of the ignition timing, the driving stability can be further increased.

In the above related art as well, means for selecting use of the stratified combustion and the premixed combustion according to the load were also disclosed, but in the related art, the frequency of the switching between the stratified combustion and the premixed combustion becomes high when for example driving up on a winding mountain road, decelerating when entering a curve, accelerating when leaving somewhere quickly, and driving at constant speed on a straight path. The load fluctuation (torque shock) at this time can make the driver or passengers uncomfortable or cause defective combustion due to the poor control operation or formation of the air-fuel mixture.

In comparison with this, according to the present invention, it is judged from the driving state, for example, an upward slope, that high load conditions frequently occur, premixed combustion by the intake stroke injection is continued even when the load is relatively low, and the mode is first switched to stratified combustion by the compression stroke injection after confirming that the slope has becomes small.

Accordingly, by the present invention, the frequency of switching of the injection mode (combustion state) can be reduced in comparison with the related art.

In a fuel injection control device disclosed in claim 2, the frequency of switching of the injection mode (combustion state) is reduced and, at the same time, at, for example, an upward slope, the transmission is shifted down by one gear simultaneously with the switching of the injection mode, whereby the engine speed is raised and the output is made high. Further, by continuing to drive at the same gear ratio of the transmission even on a curve where the load temporarily becomes low, smooth driving without a large torque shock can be realized.

In a fuel injection control device disclosed in claim 3, when the load is high, for example, the vehicle sharply accelerates when on a downward slope, there are cases where stratified combustion alone results in insufficient output, therefore fuel is injected twice in the compression stroke and in the intake stroke in such a case and an air-fuel mixture consisting of a premixture around a stratified air-fuel mixture is formed is burned. By this, the output is made high while giving priority to the stratified combustion. By continuing the stratified combustion while driving on a downward slope, the frequency of switching of the combustion state can be reduced.

In a fuel injection control device disclosed in claim 5 or 6, the operating state of the vehicle is determined based on a posture of the vehicle directly detected by using a gyroscope or based on geographical information which can be obtained by a navigation system and the same injection mode is maintained during the period where the vehicle is continuing the same driving state, so in the same way as the above case, smooth and stable driving with a small torque shock is achieved.

BRIEF DESCRIPTION OF THE DRAWINGS

These and other objects and effects of the present invention will be more apparent from the description of several embodiments given in detail below with reference to the accompanying drawings, wherein.

DESCRIPTION OF THE PREFERRED EMBODIMENTS

Figure 1:
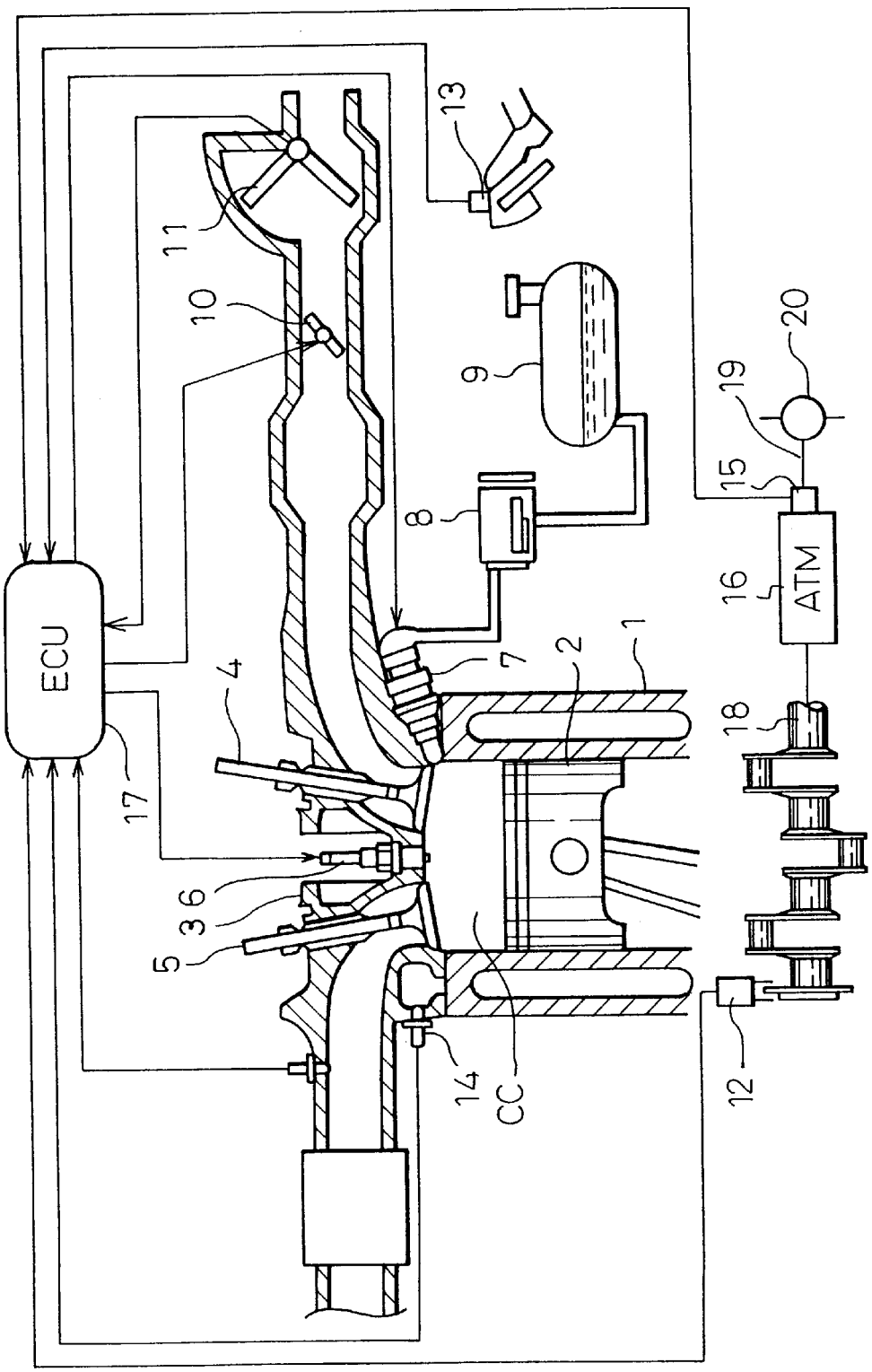
FIG. 1 is a sectional view of an example of the system configuration of a fuel injection control device according to an embodiment of the present invention.

FIG. 1 is a schematic view of the general configuration of an engine control device according to a first embodiment of the present invention and the entire as a whole. A combustion chamber CC is defined by a cylinder (cylinder block) 1, a piston 2, and a cylinder head 3. Further, in the cylinder head 3 are arranged an intake valve 4, an exhaust valve 5, a spark plug 6, and a fuel injector for injecting high pressure fuel into the combustion chamber in the form of a mist (hereinafter abbreviated as an injector) 7. Fuel in a fuel tank 9 is fed into this injector 7 by a high pressure pump 8.

Further, at a position of the intake manifold before the intake tubes communicating with the combustion chambers CC of the different cylinders branch out, a throttle valve 10 is provided for adjusting an amount of the intake air inhaled into the combustion chambers CC. At the upstream side of this throttle valve 10 seen in a direction of flow of the intake air, an air flow sensor (intake air amount detecting means) 11 for detecting the amount of the intake air is arranged.

Note that the throttle valve 10 is driven by an actuator (not illustrated) such as a servo motor. The opening degree of the throttle valve 10 is adjusted by this actuator. Further, reference numeral 12 indicates a crank angle sensor (crank angle detecting means) for detecting the crank angle of a crankshaft 18 of the engine, 13 indicates an accelerator pedal position sensor (accelerator pedal operation detecting means) for detecting the amount of operation of the accelerator pedal (accelerating means) operated by the driver for controlling the speed of the engine, 14 indicates a water temperature sensor for detecting the temperature of coolant water, 15 indicates a vehicle speed sensor attached to the output shaft 19 of an automatic transmission (ATM) 16, and 20 indicates a differential gear.

The output signals of these sensors 11 to 15 etc. are input to an electronic control unit (hereinafter referred to as an ECU) 17 comprising a read only memory (ROM), a random access memory (RAM), a central processing unit (CPU), and an input/output port of signals. This ECU 17 operates the injector 7 according to a program stored in the ROM in advance, feeds electric power to the spark plug 6, and controls the actuator for driving the throttle valve 10 based on signals from these sensors 11 to 14.

Note that, in the present embodiment, the load of the engine is determined from the amount of operation of the accelerator pedal detected by an accelerator pedal position sensor 13. The larger the amount of operation of the accelerator pedal, the higher the engine load is deemed to be.

Next, a first example of the control routine according to the present embodiment will be explained by using the flow chart shown in FIG. 2.

When the engine is started up, the control program of the ECU 17 simultaneously starts. At step 101, the ECU 17 first detects the magnitude of the required load from the output of the accelerator pedal position sensor 13. Then, at step 102, an acceleration A of the vehicle (automobile) from the output of the vehicle sensor 15 (amount of change of the vehicle speed per unit time) and an anticipated acceleration $A_0$ read from a map stored in the ROM and corresponding to the required load (degree of depression of accelerator pedal) of the engine are compared. If the actual acceleration A and the anticipated acceleration $A_0$ are equal, it is judged that the vehicle is driving on a level road (or the vehicle is stopped and the engine is idling), then the routine proceeds to step 107, where control by a normal control mode in the same way as that of the related art is executed.

Figure 3:
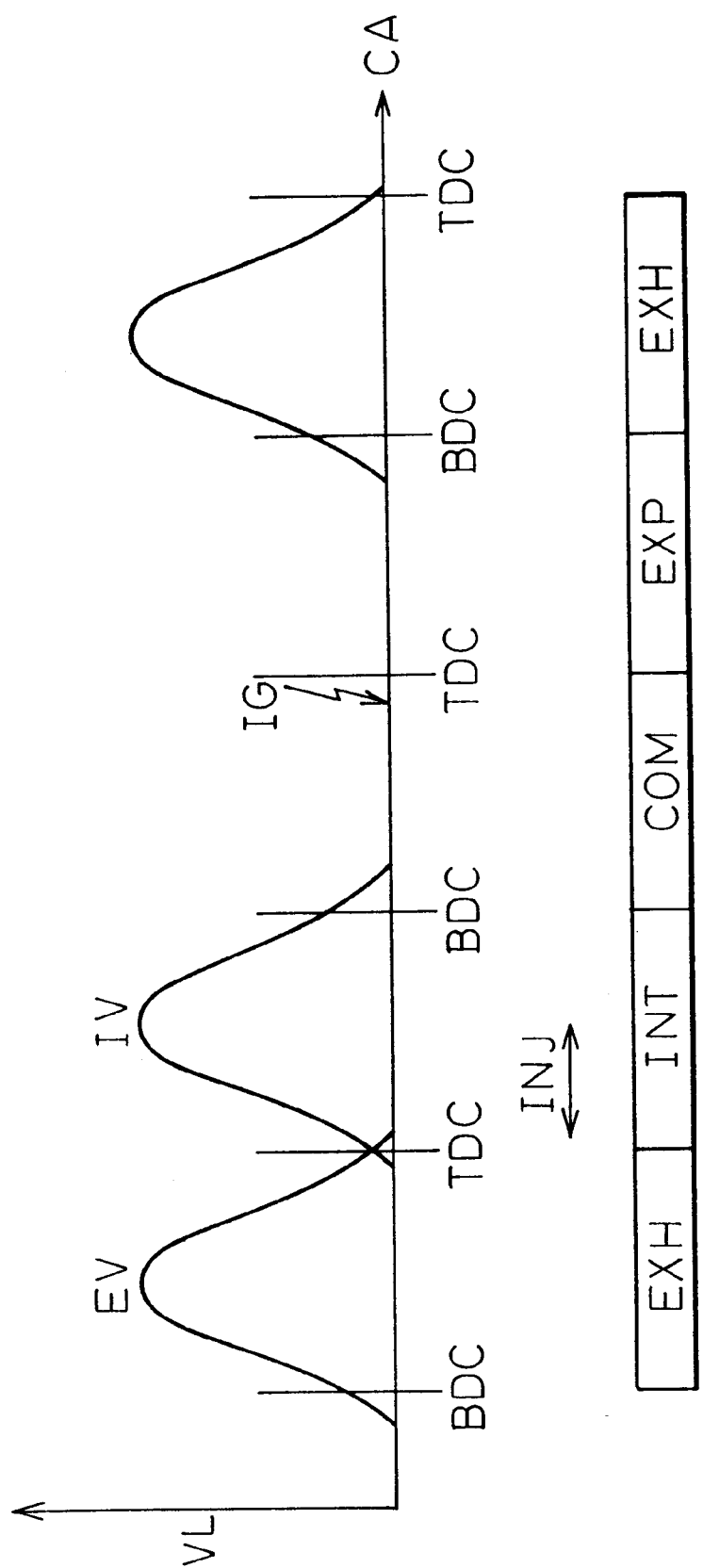
FIG. 3 is a timing chart of a intake stroke injection.

When it is judged at step 102 that the acceleration A is not equal to the anticipated acceleration $A_0$, the relative magnitudes of the two are compared at step 103. When $A<A_0$, it is judged at step 104 that the vehicle is driving on an upward slope and the routine proceeds to step 105, at which it is decided to make the injection mode of the fuel injector 7 the intake stroke injection and the injection amount and the injection timing in the intake stroke injection as shown in FIG. 3 are selected. At step 106 after this, it is judged again whether or not the acceleration A of the vehicle and the acceleration $A_0$ anticipated from the degree of depression of the accelerator pedal are equal. If they are equal, the routine proceeds to step 107, at which the normal control mode is shifted to. If they are not equal, the routine returns to step 103, at which the judgement and the selection of injection mode are repeated again. So far as the relationship of $A<A_0$ does not change, intake stroke injection is maintained as the injection mode.

Figure 6:
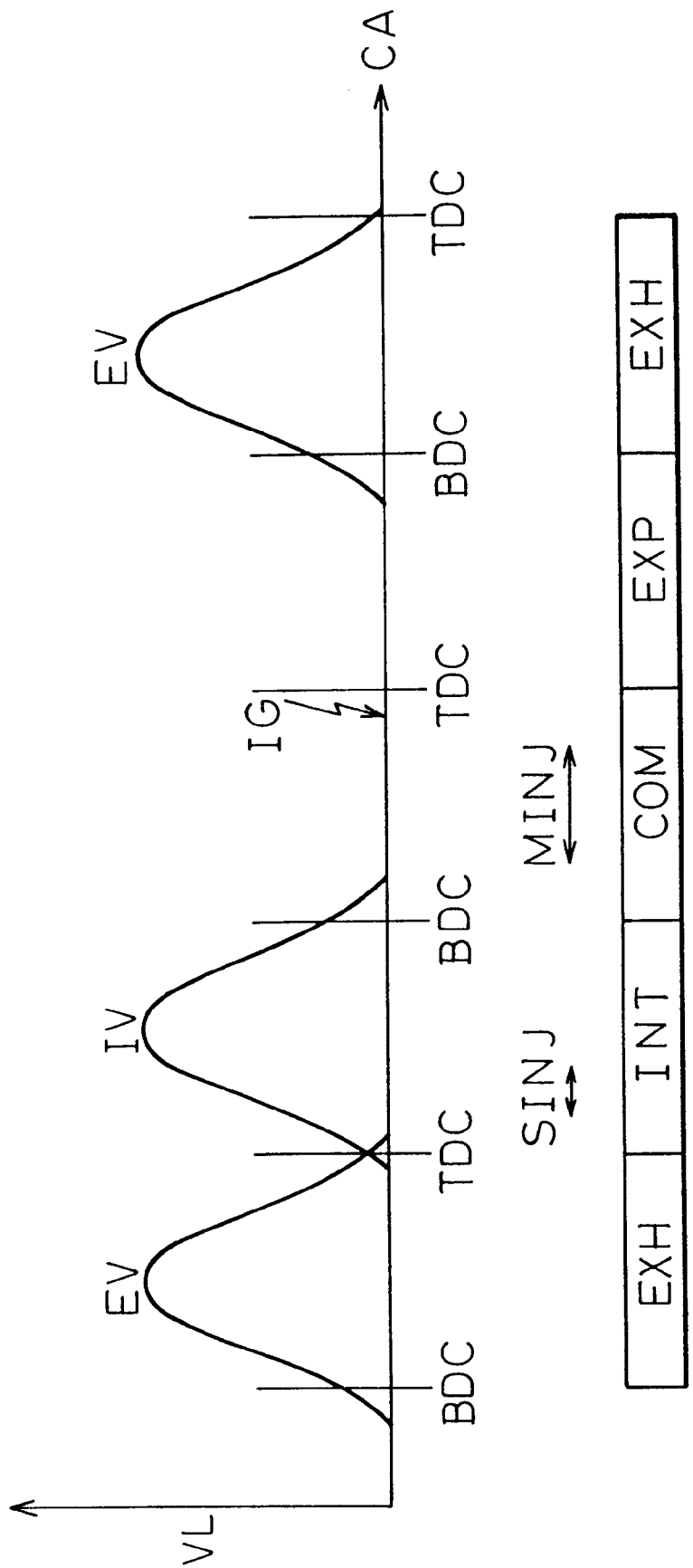
FIG. 6 is a timing chart of a two-step injection of the compression stroke and the intake stroke.

Note that in FIG. 3 and in FIG. 4 and FIG. 6 mentioned later, an abscissa indicates the crank angle (°CA), BDC denotes a bottom dead center, TDC a top dead center, INJ an injection period of fuel, IG an ignition timing, EXH an exhaust stroke, INT a intake stroke, COM a compression stroke, and EXP an expansion stroke. Further, an ordinate indicates a valve lift (VL) at the time of opening of the exhaust valve (EV) and the intake valve (IV).

Figure 4:
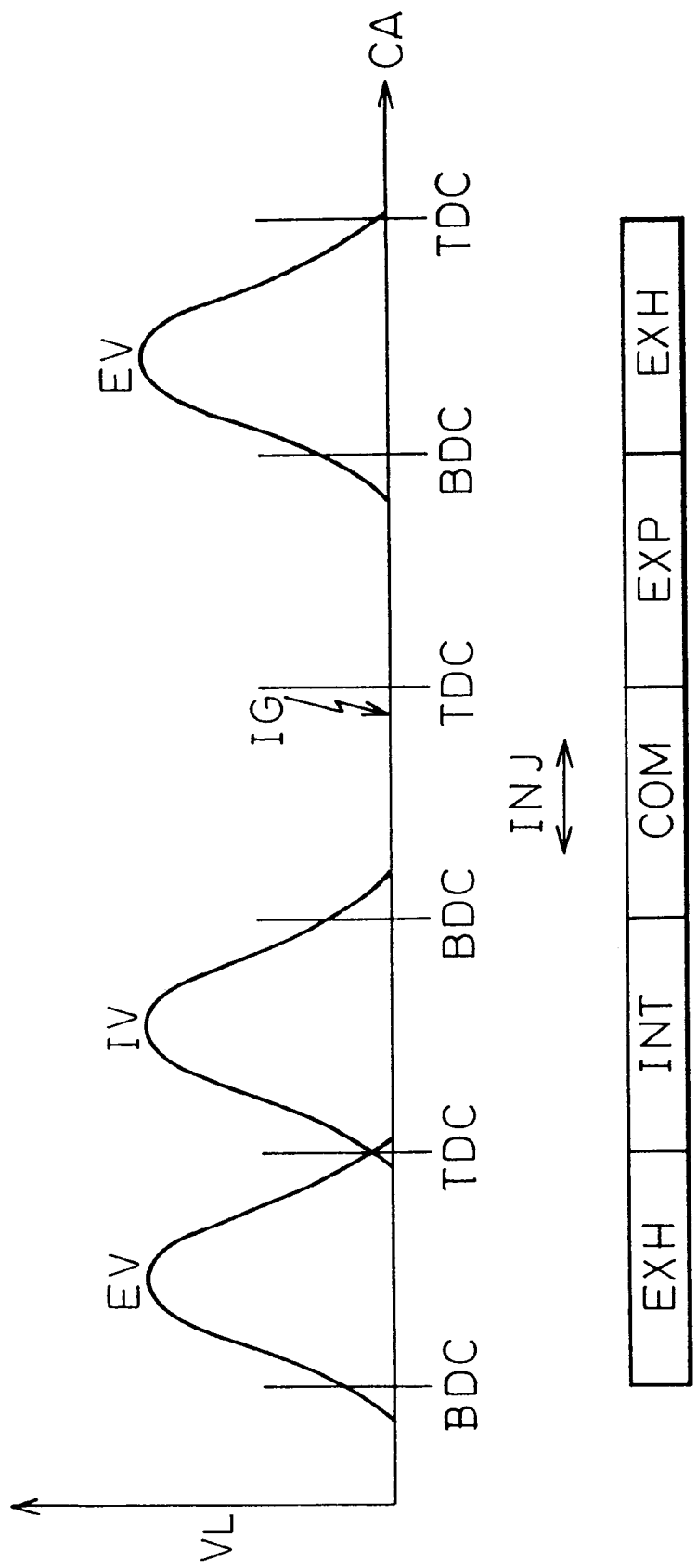
FIG. 4 is a timing chart of a compression stroke injection.

When it is judged at step 103 that the acceleration A is larger than the anticipated acceleration $A_0$ ($A>A_0$), it is judged at step 108 that the vehicle is driving on a downward slope and the routine proceeds to step 109, at which it is decided to make the injection mode of the fuel injector the compression stroke injection as shown in FIG. 4 and the injection amount and the injection timing in the compression stroke injection are selected. Then, at step 106, it is judged again whether or not the acceleration A of the vehicle and the acceleration $A_0$ anticipated from the degree of depression of the accelerator pedal are equal. This same judgement and selection of the injection mode are repeated in the subsequent control routine. So far as the relationship of $A>A_0$ does not change, compression stroke injection is maintained as the injection mode.

In this way, in this example of the control routine, so far as the relative magnitudes of the actual acceleration A of the vehicle and the acceleration $A_0$ anticipated from the required load (amount of depression of the accelerator pedal) does not change, intake stroke injection is continuously carried out when the vehicle is driving on an upward slope, while compression stroke injection is carried out when the vehicle is driving on a downward slope, therefore the injection mode does not change on the middle. That is, during a period where the same mode of driving is continued, the premixed combustion by the intake stroke injection and the stratified combustion by the compression stroke injection are not switched.

Accordingly, there is no longer a situation like in the related art where even if the same driving state continues, the injection mode of the fuel injector 7 is changed and the premixed combustion and the stratified combustion are switched when the required load (for example, amount of depression of the accelerator pedal) and the engine speed change. Since the frequency of change of the injection mode is greatly reduced, the driver and the passengers no longer sense a rough torque shock occurring when the injection mode is switched or a change of the vehicle speed. Further, even in a case where the injection mode is switched when the relative magnitude of the accelerations A and $A_0$ changes, if this is done in accordance with the change of the gear ratio in the transmission 16, it is possible to increase the output of the engine while simultaneously reducing the gear ratio by one speed, therefore, the torque shock etc. sensed by the driver and passengers become smaller.

Figure 5:
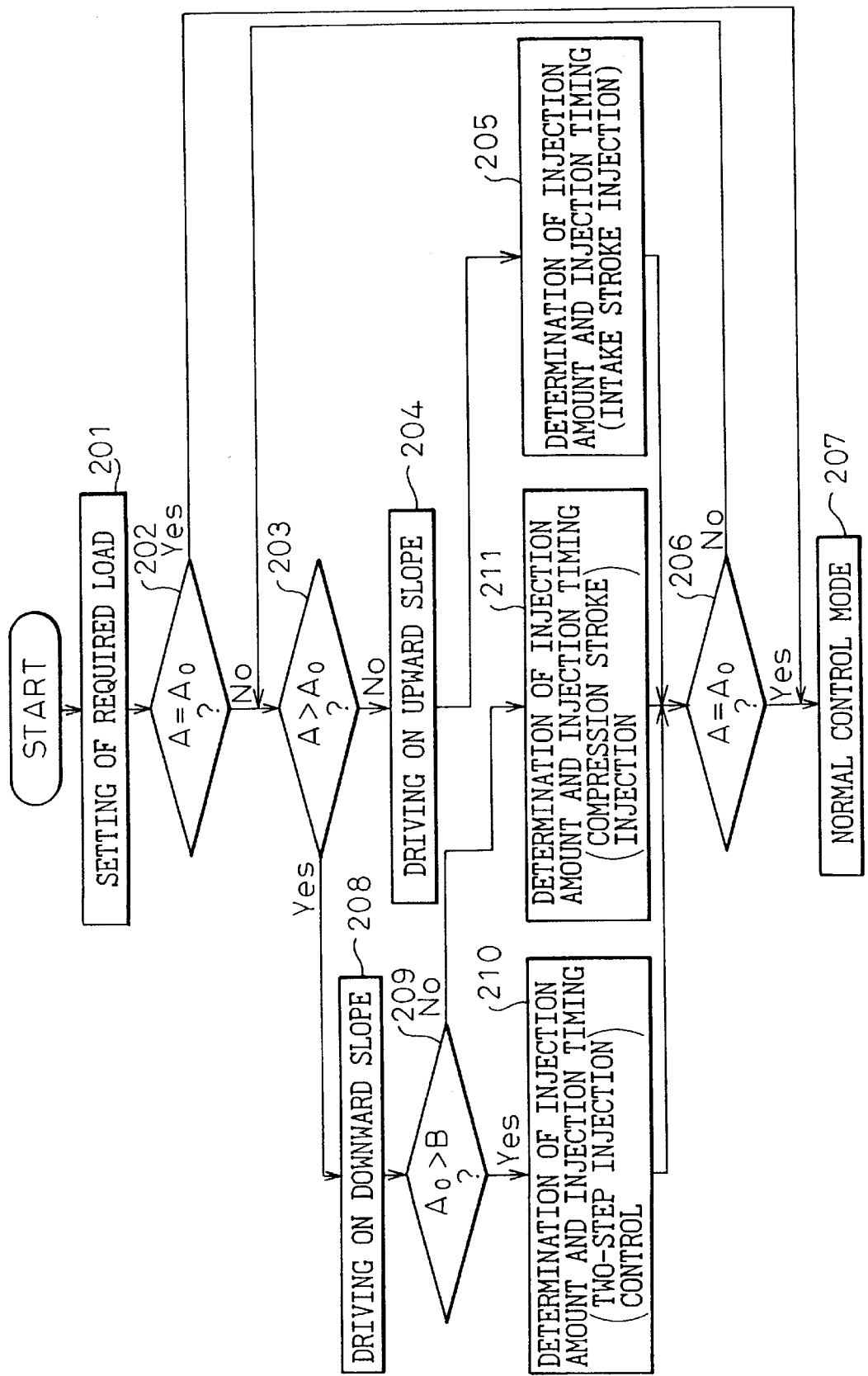
FIG. 5 is a flow chart of a second example of control.

FIG. 5 shows another example of a control routine in the embodiment of the present invention. The part from step 201 to step 208 in the example of the control routine of FIG. 5 is substantially the same as the part of from step 101 to step 108 in the example of the control routine of FIG. 2, therefore substantially overlapping explanations will be omitted.

Figure 2:
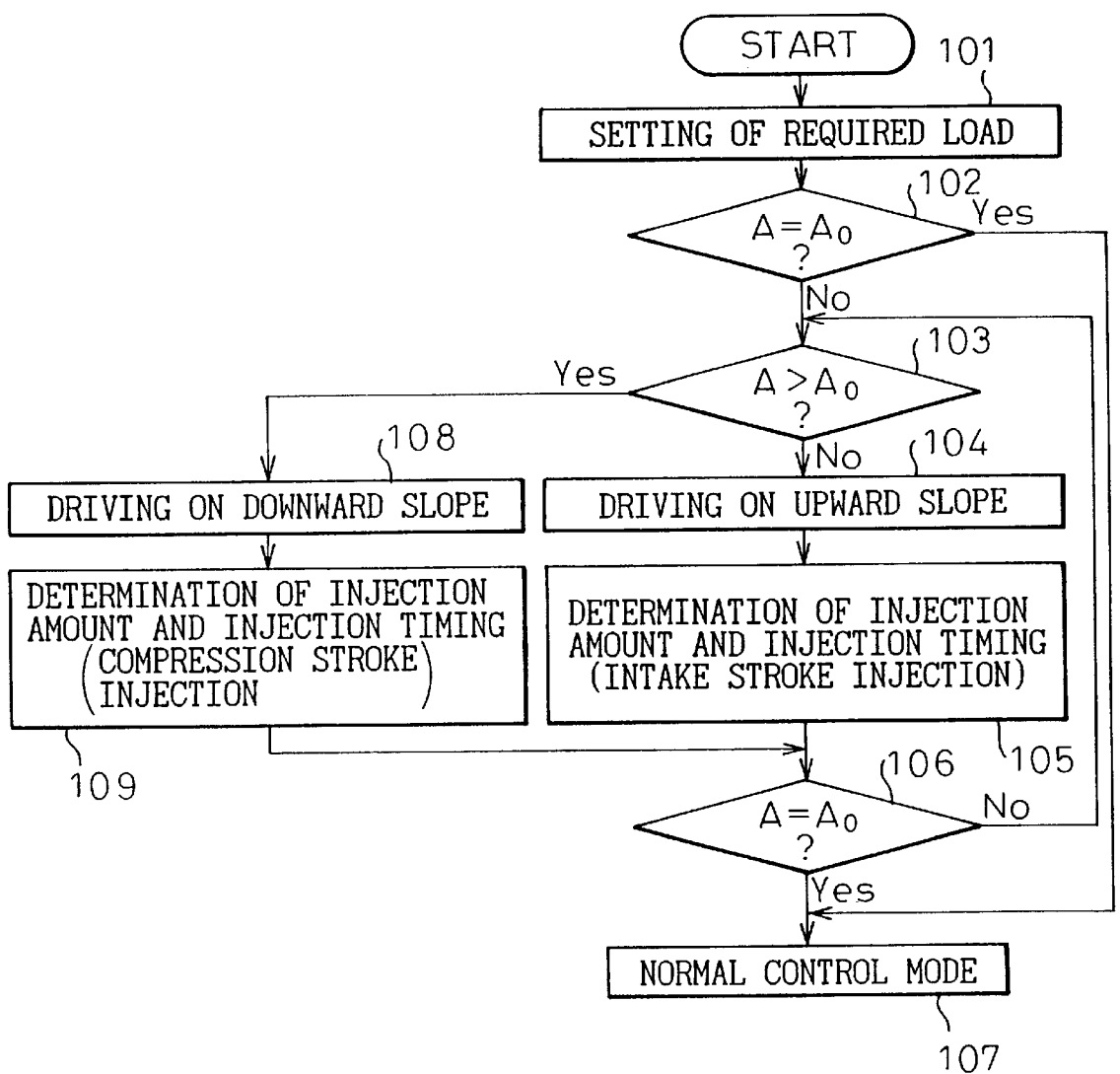
FIG. 2 is a flow chart of a first example of control.

In the part of the example of the control routine of FIG. 5 different from the example of the control routine of FIG. 2, that is, step 209, the acceleration $A_0$ anticipated from the required load (amount of depression of the accelerator pedal) and the map stored in the ROM and the acceleration B corresponding to the maximum amount of the compression stroke injection stored in the ROM are compared. Then, if $A_0>B$, even if the vehicle is driving on a downward slope, a further sharp acceleration is necessary and the required torque cannot be obtained by only the compression stroke injection, therefore the routine proceeds to step 211, at which it is decided to make the injection mode the two-step injection of the compression stroke injection and the intake stroke injection during a cycle as shown in FIG. 6 and the injection amount and the injection timing for performing the intake stroke injection as a supplementary sub-injection (SINJ) are selected in addition to the compression stroke injection of the maximum amount performed as the main injection (MINJ). In this case as well, the two-step injection is maintained so long as the relationship of the acceleration $A_0>B$ does not change.

When it is judged at step 209 in the flow chart of FIG. 5 that $A_0$ is not greater than B, that is, that $A_0 \leq B$, the routine proceeds to step 211, at which it is decided to make the injection mode the compression stroke injection and the injection amount and the injection timing thereof are selected in the same way as step 109 in the example of the control routine shown in FIG. 2. The judgement and control of step 206 on are then proceeded to in the same way as in the above case while maintaining the injection mode at the compression stroke injection.

In this way, in the example of the control routine shown in FIG. 5 as well, so long as the relative magnitude among accelerations A, $A_0$, and B does not change, the intake stroke injection, the compression stroke injection, or the two-step injection of the compression stroke and intake stroke is continuously carried out, therefore the frequency of switching of the injection mode is reduced and the number of torque shocks sensed by the driver and the passengers is reduced. Further, in the same way as the case of the example of the control routine of FIG. 2, in the example of the control routine of FIG. 5, the switching of the injection mode to be performed when the relative magnitude among the accelerations A, $A_0$, and B changes is carried out along with the change of the gear ratio in the transmission 16, whereby the torque shock etc. can be further reduced.

Note that, in the above embodiment, the amount of the required load with respect to the engine is set from an accelerator pedal position signal (steps 101 and 201), the anticipated acceleration $A_0$ corresponding to the required load is read from a map stored in the ROM, and the latter is compared with the actual vehicle acceleration, whereby it is decided in which state the vehicle is driving, that is, driving on a level road, driving on an upward slope, or driving on a downward slope (steps 102, 103, 202, and 203), but as another alternative example, it is also possible to directly determine the driving state of the vehicle from the posture of the vehicle detected by using a gyroscope or determine the geographical environment or situation under which the vehicle is now placed by a navigation system and utilize the information for the determination of the driving state of the vehicle and reflect this in the control result. In any case, the same injection mode is maintained during a period where the same pattern of the driving state is continued.

While the present invention was described by citing specified embodiments selected for the purpose of illustration, it is clear that many other applications are possible by persons skilled in the art within the fundamental idea and claims of the present invention.

What is claimed is:

1. A fuel injection control device for a cylinder direct fuel injection type engine provided with a fuel injector with an injection port opening in a combustion chamber for directly injecting the fuel into said combustion chamber, provided with:

load detecting means for detecting a magnitude of a load required for said engine;

rotational speed detecting means for detecting a rotational speed of said engine;

vehicle speed detecting engine for detecting a driving speed of a vehicle mounting said engine; and controlling means for controlling a fuel injection timing and a fuel injection amount of said fuel injector based on signals of these detecting means;

when said controlling means detects that said vehicle is in at least a driving state on an upward slope or a downward slope, it selects either of an intake stroke injection or a compression stroke injection or a two-step injection of the intake stroke and compression stroke as an injection mode according to which driving state the vehicle is in, and performs control so that the same injection mode is maintained during a period where the same driving state is continued.

2. A fuel injection control device of a cylinder direct injection engine according to claim 1, wherein said controlling means changes the injection mode along with a timing when a change of a gear ratio occurs in a transmission.

3. A fuel injection control device of a cylinder direct injection engine according to claim 1, wherein when said vehicle is in a driving state on a downward slope and the load has a magnitude of a predetermined value or more, said controlling means instructs two-step injection for performing a supplementary intake stroke injection in addition to the compression stroke injection as the injection mode of said fuel injector and thereby enables a high output operation while giving priority to stratified combustion.

4. A fuel injection control device of a cylinder direct injection engine according to claim 1, wherein said load detecting means is an accelerator pedal position detecting means.

5. A fuel injection control device of a cylinder direct injection engine according to claim 1, wherein the driving state of the vehicle is directly determined from a posture of the vehicle detected by using a gyroscope.

6. A fuel injection control device of a cylinder direct injection engine according to claim 1, wherein the driving state of the vehicle is indirectly determined based on a geographical situation which can be learned from a navigation system.

* * * * *

UNITED STATES PATENT AND TRADEMARK OFFICE
CERTIFICATE OF CORRECTION

PATENT NO. : 6,026,781
DATED : February 22, 2000
INVENTOR(S) : Imatake et al.

It is certified that error appears in the above-identified patent and that said Letters Patent is hereby corrected as shown below:

Title page,
Change "[73] Assignees: Nippon Soken, Inc., Nishio;
Toyoda Jidosha Kabushika Kaisha, Toyota,
both of Japan"

TO

-- [73] Assignees: Nippon Soken, Inc., Nishio;
Toyota Jidosha Kabushiki Kaisha, Toyota,
both of Japan --

Signed and Sealed this

Thirtieth Day of October, 2001

Attest:

*Attesting Officer*

NICHOLAS P. GODICI
*Acting Director of the United States Patent and Trademark Office*